United States Patent
Karapantelakis et al.

(10) Patent No.: US 10,855,737 B2
(45) Date of Patent: Dec. 1, 2020

(54) CONTROL OF MEDIA TRANSCODING DURING A MEDIA SESSION

(71) Applicant: Telefonaktiebolaget LM Ericsson (publ), Stockholm (SE)

(72) Inventors: Athanasios Karapantelakis, Stockholm (SE); Craig Donovan, Bromma (SE); Maxim Teslenko, Sollentuna (SE); Vlasios Tsiatsis, Solna (SE); Aneta Vulgarakis Feljan, Stockholm (SE); Keven Wang, Sollentuna (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 30 days.

(21) Appl. No.: 16/090,870

(22) PCT Filed: May 12, 2016

(86) PCT No.: PCT/EP2016/060746
§ 371 (c)(1),
(2) Date: Oct. 3, 2018

(87) PCT Pub. No.: WO2017/194134
PCT Pub. Date: Nov. 16, 2017

(65) Prior Publication Data
US 2019/0109884 A1    Apr. 11, 2019

(51) Int. Cl.
*G06F 13/00* (2006.01)
*H04L 29/06* (2006.01)
(Continued)

(52) U.S. Cl.
CPC .......... *H04L 65/605* (2013.01); *H04L 65/608* (2013.01); *H04W 28/0221* (2013.01);
(Continued)

(58) Field of Classification Search
CPC ............... H04L 65/605; H04L 65/608; H04W 28/0221; H04W 52/223; H04W 52/262;
(Continued)

(56) References Cited

U.S. PATENT DOCUMENTS

| 6,683,916 B1 * | 1/2004 | Sartori ................... H04L 1/0003 375/295 |
| 7,962,182 B2 * | 6/2011 | Kwan ................. H04W 52/267 348/14.12 |

(Continued)

FOREIGN PATENT DOCUMENTS

WO    2009009166 A1    1/2009

OTHER PUBLICATIONS

Poellabauer, C. et al., "Energy-Aware Media Transcoding in Wireless Systems", Proceedings of the Second IEEE Annual Conference on Pervasive Computing and Communications, Mar. 17, 2004, pp. 1-10, IEEE.

Primary Examiner — Kenneth R Coulter
(74) Attorney, Agent, or Firm — Patent Portfolio Builders, PLLC

(57) ABSTRACT

There is provided mechanisms for controlling media transcoding of a media session between at least two media transceiver devices. The method is performed by a network node. The method comprises obtaining, from at least one of the media transceiver devices, an indication of current allocation of energy for performing playback of the media session in the at least one of the media transceiver devices. The method comprises controlling transcoding of the media session according to the current allocation of energy of the at least one media transceiver device. The transcoding comprises either conversion from a first media format to a second media format of same media type, or conversion from a first media type to a second media type.

20 Claims, 7 Drawing Sheets

(51) Int. Cl.
  *H04W 28/02* (2009.01)
  *H04W 52/22* (2009.01)
  *H04W 52/26* (2009.01)
  *H04W 52/38* (2009.01)
  *H04W 52/46* (2009.01)
  *H04W 88/18* (2009.01)

(52) U.S. Cl.
  CPC ....... *H04W 52/223* (2013.01); *H04W 52/262* (2013.01); *H04W 52/265* (2013.01); *H04W 52/267* (2013.01); *H04W 52/386* (2013.01); *H04W 52/46* (2013.01); *H04W 88/181* (2013.01)

(58) Field of Classification Search
  CPC ............. H04W 88/181; H04W 52/267; H04W 52/386; H04W 52/46; H04W 52/265
  USPC .................................................. 709/227–232
  See application file for complete search history.

(56) References Cited

U.S. PATENT DOCUMENTS

| | | | |
|---|---|---|---|
| 10,154,258 B2 * | 12/2018 | He | ........................ H04N 19/44 |
| 2004/0013207 A1 * | 1/2004 | Sartori | .................. H04L 1/0003 |
| | | | 375/297 |
| 2008/0049660 A1 | 2/2008 | Kwan et al. | |
| 2014/0010282 A1 | 1/2014 | He et al. | |
| 2015/0281299 A1 | 10/2015 | Moustafa et al. | |

\* cited by examiner

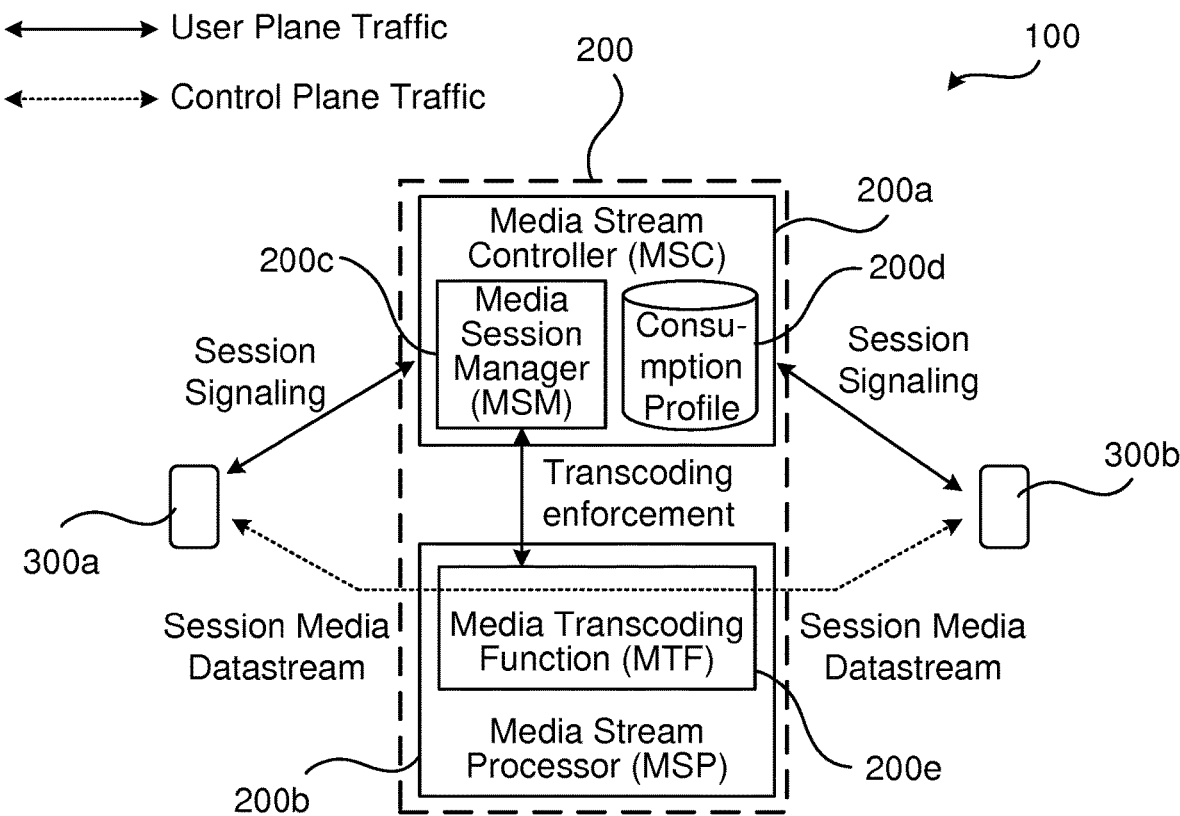
Fig. 1
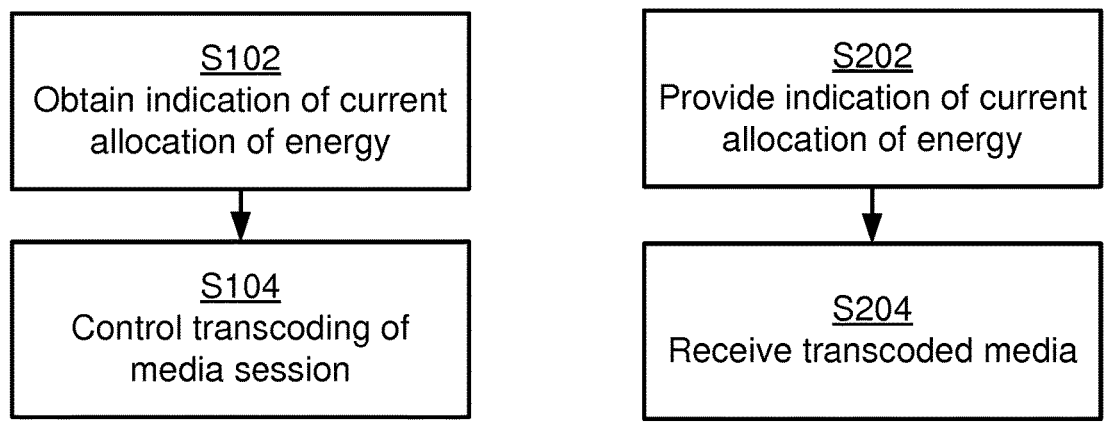
Fig. 2
Fig. 4

CONTROL OF MEDIA TRANSCODING DURING A MEDIA SESSION

TECHNICAL FIELD

Embodiments presented herein relate to a method, a network node, a computer program, and a computer program product for controlling media transcoding of a media session between at least two media transceiver devices. Embodiments presented herein further relate to a method, a media transceiver device, a computer program, and a computer program product for receiving media of a media session.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability to communicate media (such as video, audio, and/or text) in a media session between at least two media transceiver devices.

The media session involves a negotiation and establishment procedure. In general terms, current negotiation and establishment of media sessions between peers (where each peer is a media transceiver device) in communications networks are based on mutual agreement of the peers on what type of media coding will be used for encoding and decoding the media of the media session.

This agreement is based on a mutual exchange of device capabilities (also known as media or capability negotiation), in terms of what video, audio, and/or text coding each media transceiver device is able to use. Examples include, but are not limited to, the Session Description Protocol (SDP), which is embedded into the Session Initiation Protocol (SIP) and Call Control Protocol H.245, which is embedded into the H.323 standard. Determination of which codec to use is based on preference. However, the H.323 standard does not specify what this preference is. Another option is to lower the media quality for all peers to decrease the data size.

Hence, there is still a need for improved media session negotiation.

SUMMARY

An object of embodiments herein is to provide efficient media session negotiation.

According to a first aspect there is presented a method for controlling media transcoding of a media session between at least two media transceiver devices. The method is performed by a network node. The method comprises obtaining, from at least one of the media transceiver devices, an indication of current allocation of energy for performing playback of the media session in the at least one of the media transceiver devices. The method comprises controlling transcoding of the media session according to the current allocation of energy of the at least one media transceiver device. The transcoding comprises either conversion from a first media format to a second media format of same media type, or conversion from a first media type to a second media type.

According to a second aspect there is presented a network node for controlling media transcoding of a media session between at least two media transceiver devices. The network node comprises processing circuitry. The processing circuitry is configured to cause the network node to obtain, from at least one of the media transceiver devices, an indication of current allocation of energy for performing playback of the media session in the at least one of the media transceiver devices. The processing circuitry is configured to cause the network node to control transcoding of the media session according to the current allocation of energy of the at least one media transceiver device. The transcoding comprises either conversion from a first media format to a second media format of same media type, or conversion from a first media type to a second media type.

According to a third aspect there is presented a network node for controlling media transcoding of a media session between at least two media transceiver devices. The network node comprises processing circuitry and a computer program product. The computer program product stores instructions that, when executed by the processing circuitry, causes the network node to perform steps, or operations. The steps, or operations, cause the network node to obtain, from at least one of the media transceiver devices, an indication of current allocation of energy for performing playback of the media session in the at least one of the media transceiver devices. The steps, or operations, cause the network node to control transcoding of the media session according to the current allocation of energy of the at least one media transceiver device. The transcoding comprises either conversion from a first media format to a second media format of same media type, or conversion from a first media type to a second media type.

According to a fourth aspect there is presented a network node for controlling media transcoding of a media session between at least two media transceiver devices. The network node comprises an obtain module configured to obtain, from at least one of the media transceiver devices, an indication of current allocation of energy for performing playback of the media session in the at least one of the media transceiver devices. The network node comprises a control module configured to control transcoding of the media session according to the current allocation of energy of the at least one media transceiver device. The transcoding comprises either conversion from a first media format to a second media format of same media type, or conversion from a first media type to a second media type.

According to a fifth aspect there is presented a computer program for controlling media transcoding of a media session between at least two media 3o transceiver devices, the computer program comprising computer program code which, when run on processing circuitry of a network node, causes the network node to perform a method according to the first aspect.

According to a sixth aspect there is presented a method for receiving media of a media session. The method is performed by a media transceiver device. The method comprises providing an indication of current allocation of energy for performing playback of the media session in the media transceiver device to a network node. The method comprises receiving media of the media session, wherein transcoding of the media session has, by the network node, been controlled according to the current allocation of energy. The transcoding comprises either conversion from a first media format to a second media format of same media type, or conversion from a first media type to a second media type.

According to a seventh aspect there is presented a media transceiver device for receiving media of a media session. The media transceiver device comprises processing circuitry. The processing circuitry is configured to cause the media transceiver device to provide an indication of current allocation of energy for performing playback of the media session in the media transceiver device to a network node. The processing circuitry is configured to cause the media transceiver device to receive media of the media session, wherein transcoding of the media session has, by the network node, been controlled according to the current allocation of energy. The transcoding comprises either conversion from a first media format to a second media format of same media type, or conversion from a first media type to a second media type.

According to an eighth aspect there is presented a media transceiver device for receiving media of a media session. The media transceiver device comprises processing circuitry and a computer program product. The computer program product stores instructions that, when executed by the processing circuitry, causes the media transceiver device to perform steps, or operations. The steps, or operations, cause the media transceiver device to provide an indication of current allocation of energy for performing playback of the media session in the media transceiver device to a network node. The steps, or operations, cause the media transceiver device to receive media of the media session, wherein transcoding of the media session has, by the network node, been controlled according to the current allocation of energy. The transcoding comprises either conversion from a first media format to a second media format of same media type, or conversion from a first media type to a second media type.

According to a ninth aspect there is presented a media transceiver device for receiving media of a media session. The media transceiver device comprises a provide module configured to provide an indication of current allocation of energy for performing playback of the media session in the media transceiver device to a network node. The media transceiver device comprises a receive module configured to receive media of the media session, wherein transcoding of the media session has, by the network node, been controlled according to the current allocation of energy. The transcoding comprises either conversion from a first media format to a second media format of same media type, or conversion from a first media type to a second media type.

According to a tenth aspect there is presented a computer program for receiving media of a media session, the computer program comprising computer program code which, when run on processing circuitry of a media transceiver device, causes the media transceiver device to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium can be a non-transitory computer readable storage medium.

Advantageously these methods, these network nodes, these media transceiver devices, and these computer programs provide efficient media session negotiation by the network node controlling the media transcoding of the media session between the at least two media transceiver devices.

Advantageously these methods, these network nodes, these media transceiver devices, and these computer programs result in energy efficient operation of the media transceiver devices.

Advantageously these methods, these network nodes, these media transceiver devices, and these computer programs can be beneficial to the media session longevity.

Advantageously these methods are applicable for different types of media transceiver devices; from legacy mobile phones only capable of handling low-quality audio and text to current generation smartphones, tablets, laptops, etc. capable of handling also high-quality audio and video.

Advantageously the functionality of the network node can be implemented as part of existing standards and/or media session management nodes.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 1 is a schematic diagram illustrating a communication system according to embodiments;

FIGS. 2, 3, 4, and 5 are flowcharts of methods according to embodiments;

DETAILED DESCRIPTION

Figure 5:
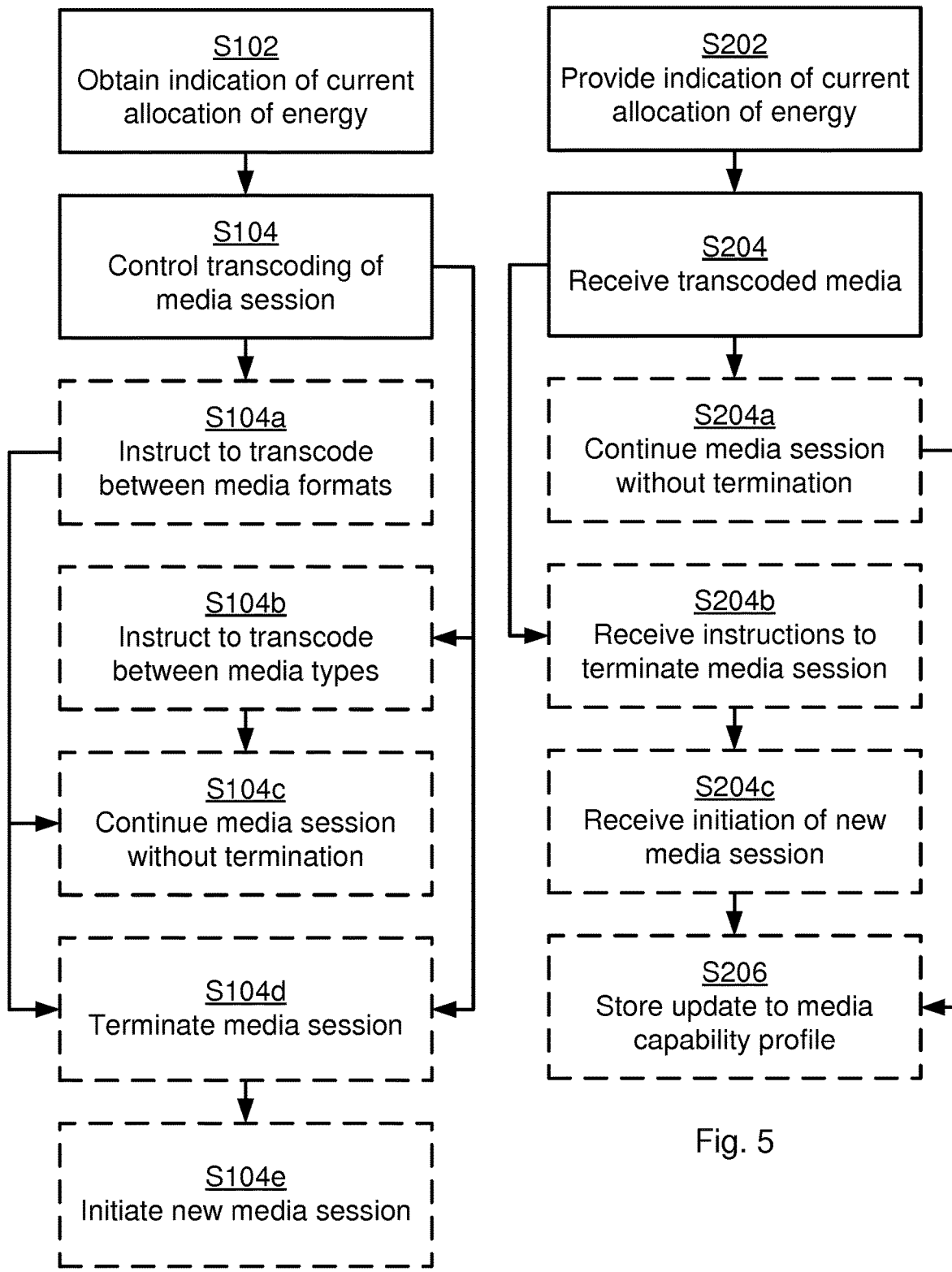

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above, there is a need for improved media session negotiation.

The embodiments disclosed herein therefore relate to mechanisms for controlling media transcoding of a media session between at least two media transceiver devices. In order to obtain such mechanisms there is provided a network node, a method performed by the network node, a computer program product comprising code, for example in the form of a computer program, that when run on processing circuitry of the network node, causes the network node to perform the method.

The embodiments disclosed herein further relate to mechanisms for receiving to media of a media session. In order to obtain such mechanisms there is provided a media transceiver device, a method performed by the media transceiver device, and a computer program product comprising code, for example in the form of a computer program, that when run on processing circuitry of the media transceiver device, causes the media transceiver device $300a$ to perform the method.

FIG. 1 is a schematic diagram illustrating a communications system too where embodiments presented herein can be applied. The communications system too comprises a network node 200 and at least two media transceiver devices $300a$, $300b$.

The media transceiver devices $300a$, $300b$ are configured to establish a media session between them. The media transceiver devices $300a$, $300b$ are further configured to be aware of their current energy reserves (i.e. as a percentage of the total battery level or estimated time remaining until such energy reserves are depleted), and more particularly, their current allocation of energy for performing playback of the media session. Each media transceiver device $300a$, $300b$ may have an associated consumption and media capability profile comprising information of which media types are preferable for the media session based on the energy reserve level. Examples of media transceiver devices $300a$, $300b$ include, but are not limited to, $3o$ portable wireless devices, mobile stations, mobile phones, handsets, wireless local loop phones, user equipment (UE), smartphones, laptop computers, and tablet computers. According to an embodiment one of the media transceiver devices $300b$ is configured to stream media to the other media transceiver device $300a$ and hence act as a media server during the media session. That is, at least one of the media transceiver devices $300a$ is a media playback device and at most one of the media transceiver devices $300b$ is a media server. Hence, the below description is applicable also where one of the one of the media transceiver devices $300b$ is configured as a media server.

The network node 200 comprises a Media Stream Controller (MSC) functionality $200a$. The network node 200 could optionally comprise also a Media Stream Processor (MSP) functionality $200b$. The MSC functionality and the MSP functionality can thus be collocated in the same physical nodes or in separate physical nodes The MSC functionality and the MSP functionality work together in order to initiate media coding in new sessions or modify media coding in ongoing media sessions between the at least two media transceiver devices $300a$, $300b$ based on current allocation of energy for performing playback of the media session of the media transceiver devices $300a$, $300b$ involved in these media sessions.

The MSC functionality is responsible for controlling the media transcoding process based on the above defined allocation of energy and consumption profiles of the media transceiver devices $300a$, $300b$ participating in the media session. Selection of a codec is performed by the MSC and from a component denoted Media Session Manager (MSM) 200C. The MSM is thus aware of the above defined allocation of energy of the media transceiver devices $300a$, $300b$ participating in the media session. The network node 200 could further comprise a database good, denoted a Consumption Profile database, for storing consumption profiles.

The MSP functionality performs the actual transcoding of the media. The $3o$ MSP functionality accepts transcoding enforcement directives from the MSC functionality, either for a new media session or an ongoing media session. Each transcoding enforcement directive comprises instructions on starting, stopping or modifying media transcoding for a particular media session. In this respect the MSP comprises a Media Transcoding Function (MTF) $200e$ implementing the transcoding functionality. The functionality of MTF is only required for codec transcoding (See Table 2 below). In case there is no transcoding required (See Table 1 below), then the functionality of the MTF is not needed.

The embodiments disclosed herein are based controlling media transcoding of a media session between at least two media transceiver devices $300a$, $300b$ based on current allocation of energy for performing playback of the media session in this at least one of the media transceiver devices $300a$, $300b$ with an end-goal to preserve the longevity of the media session to the greatest extend possible. Detailed operations of the network node 200 and the playback devices $300a$, $300b$ for controlling media transcoding of the media session between the at least two media transceiver devices $300a$, $300b$ will now be disclosed.

Figure 7:
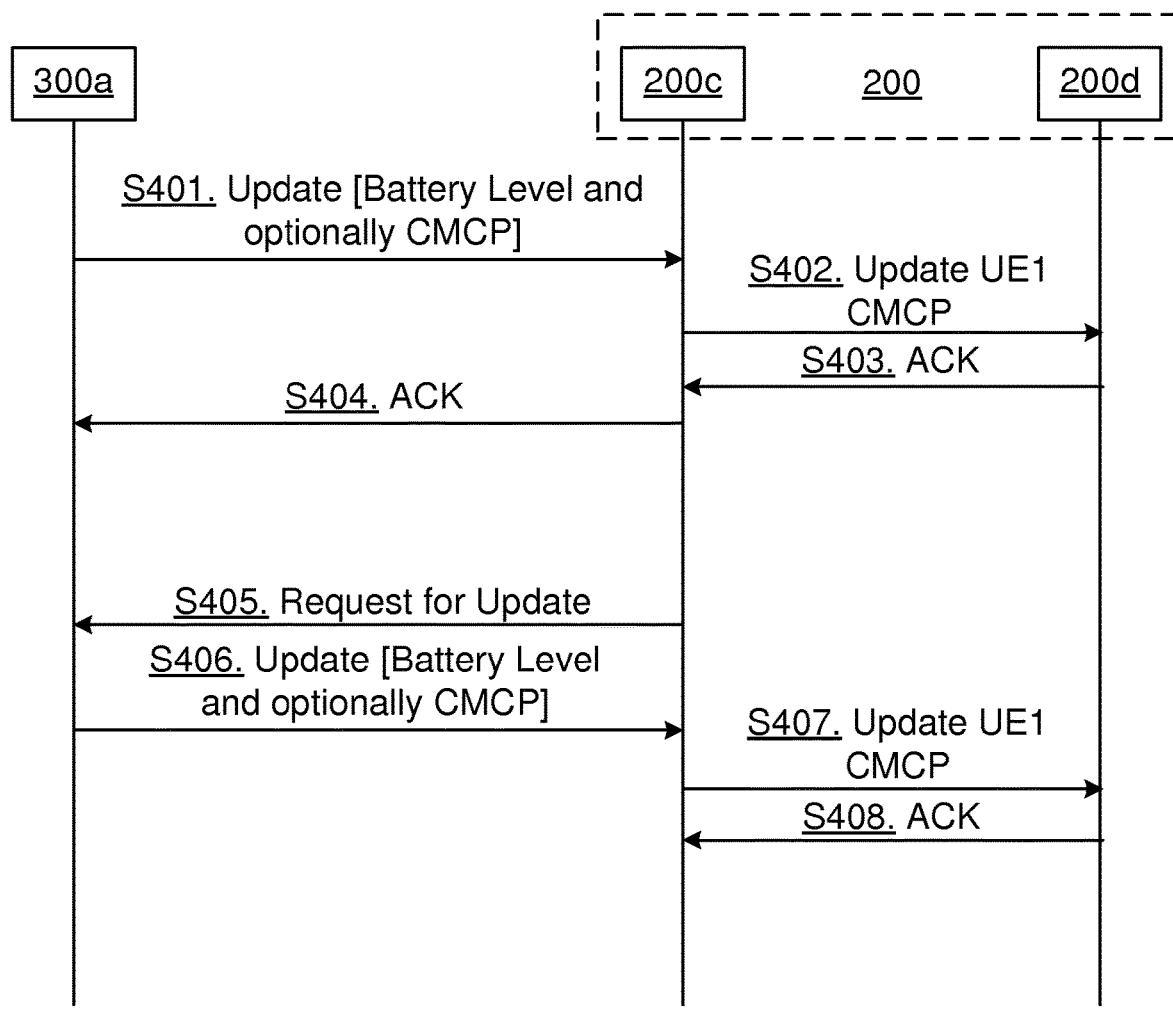
Figure 8:
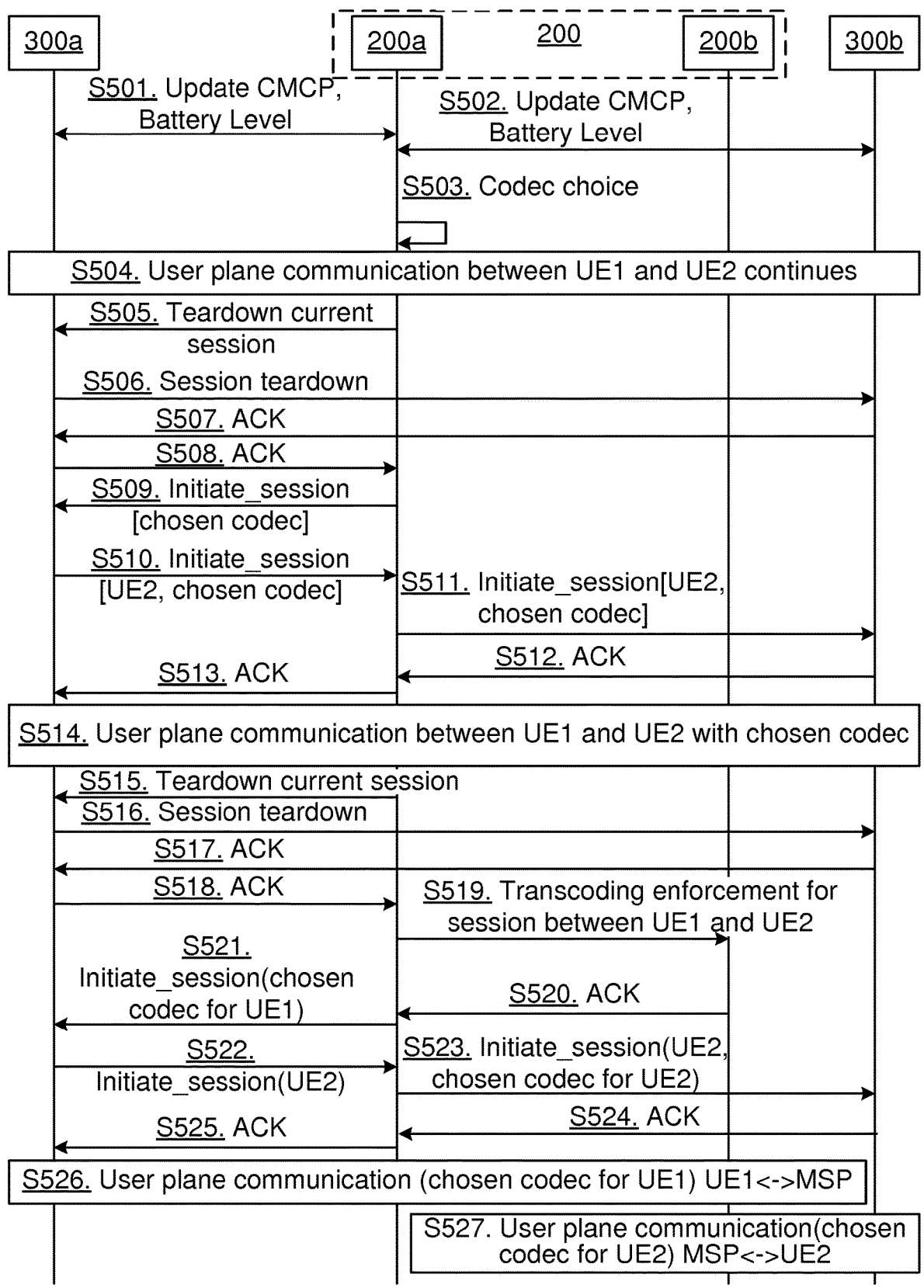

FIGS. 2 and 3 are flow charts illustrating embodiments of methods for controlling media transcoding of a media session between at least two media transceiver devices $300a$, $300b$ as performed by the network node 200. FIGS. 7 and 8 are flow charts illustrating embodiments of methods for receiving media of a media session as performed by the media transceiver device $300a$. The methods are advantageously provided as computer programs $1420a$, $1420b$.

Reference is now made to FIG. 2 illustrating a method for controlling media transcoding of a media session between at least two media transceiver devices $300a$, $300b$ as performed by the network node 200 according to an embodiment.

S102: The network node 200 obtains, from at least one of the media $3o$ transceiver devices $300a$, $300b$, an indication of current allocation of energy for performing playback of the media session in this at least one of the media transceiver devices $300a$, $300b$.

S104: The network node 200 controls transcoding of the media session according to the current allocation of energy of the at least one media transceiver device $300a$, $300b$. The transcoding comprising either conversion (of the media) from a first media format to a second media format of same media type, or conversion (of the media) from a first media type to a second media type. Examples of such conversions will be described below.

The network node 200 is thereby configured to decide which set of codecs to allocate to the media session, for example based on the battery level of the media transceiver devices $300a$, $300b$ participating in the media session. The set of codecs can be renegotiated during the media session and can involve transformation of the media session from one of higher quality (e.g. video and audio) to one of lower quality (e.g. still images or text).

Embodiments relating to further details of controlling media transcoding of a media session between at least two media transceiver devices 300a, 300b as performed by the network node 200 will now be disclosed.

Reference is now made to FIG. 3 illustrating methods for controlling media transcoding of a media session between at least two media transceiver devices 300a, 300b as performed by the network node 200 according to further embodiments. It is assumed that steps S102, S104 are performed as disclosed above and a thus repeated description thereof is therefore omitted.

There may be different ways for the network node 200 to control the transcoding of the media session. Different embodiments relating thereto will now be described in turn.

As disclosed above, the transcoding can comprise conversion (of the media) from a first media format to a second media format of same media type (e.g., from a first video format to a second video format, or from a first audio format to a second audio format). Hence, according to a first embodiment the network node 200 is configured to perform step S104a as part of step S104:

S104a: The network node 200 instructs the media transcoding function to transcode the media to be delivered to the at least one of the media transceiver devices 300a, 300b from the first media format to the second media format. The second media format requires lower allocation of energy for playback than the first media format.

As further disclosed above, the transcoding can comprise conversion (of the media) from a first media type to a second media type (e.g., from a video format to an audio format, from a video format to a text format, or from an audio format to a text format). Hence, according to a second embodiment the network node 200 is configured to perform step S104b as part of step S104:

S104b: The network node 200 instructs the media transcoding function to transcode the media to be delivered to the at least one of the media transceiver devices 300a, 300b from the first media type to the second media type. The second media type requires lower allocation of energy for playback of the media than the first media type.

There may be further different ways for the network node 200 to control the transcoding of the media session. Different embodiments relating thereto will now be described in turn.

According to some aspects the network node 200 continues the media session when controlling the transcoding of the media session. Hence, according to a first embodiment the network node 200 is configured to perform step S104c as part of step S104

S104c: The network node 200 continues the media session without termination when controlling the transcoding of the media session.

According to some aspects the network node 200 instead terminates the media session when controlling the transcoding of the media session. Hence, according to a second embodiment the network node 200 is configured to perform step S104d as part of step S104:

S104d: The network node 200 terminates the media session before controlling the transcoding of the media session.

The network node 200 the needs to initiate a new media session to allow the media transfer between at least two media transceiver devices 300a, 300b to continue. Hence, according to this second embodiment the network node 200 is configured to perform step S104e as part of step S104:

S104e: The network node 200 initiates, upon having controlled the transcoding of the media session, a new media session between the at least two media transceiver devices 300a, 300b so as to continue the media session.

Reference is now made to FIG. 4 illustrating a method for receiving media of a media session as performed by the media transceiver device 300a according to an embodiment.

S202: The media transceiver device 300a provides an indication of current allocation of energy for performing playback of the media session in the media transceiver device 300a to the network node 200.

The network node 200 controls transcoding of the media session according to the current allocation of energy of the media transceiver device 300a as in step S104. The media transceiver device 300a therefore receives media of the media session as in step S204:

S204: The media transceiver device 300a receives media of the media session. Transcoding of the media session has, by the network node 200, been controlled according to the current allocation of energy. As disclosed above, the transcoding comprises either conversion from a first media format to a second media format of same media type, or conversion from a first media type to a second media type.

Embodiments relating to further details of receiving media of a media session will now be disclosed.

Reference is now made to FIG. 5 illustrating methods for receiving media of a media session as performed by the media transceiver device 300a according to further embodiments. It is assumed that steps S202, S204 are performed as disclosed above and a thus repeated description thereof is therefore omitted.

As disclosed above, there may be different ways for the network node 200 to control the transcoding of the media session. Likewise, there may be different ways for the media transceiver device 300a to receive the media of the media session. A first embodiment disclosed above involves the network node 200 to continue the media session without termination when controlling the transcoding of the media session. Hence, according to a first embodiment the media transceiver device 300a is configured to perform step S204a as part of step S204:

S204a: The media transceiver device 300a continues the media session without termination when having the transcoding of the media session controlled by the network node 200.

A second embodiment disclosed above involves the network node 200 to terminate the media session when controlling the transcoding of the media session. Hence, according to a second embodiment the media transceiver device 300a is configured to perform step S204b as part of step S204:

S204b: The media transceiver device 300a receives instructions to terminate the media session before having the transcoding of the media session controlled by the network node 200.

The second embodiment disclosed above involves the network node 200 to initiate a new media session when controlling the transcoding of the media session. Hence, according to the second embodiment the media transceiver device 300a is configured to perform step S204c as part of step S204:

S204c: The media transceiver device 300a receives initiation of a new media session between so as to continue the media session upon having the transcoding of the media session been controlled by the network node 200.

Further embodiment for controlling media transcoding of a media session between at least two media transceiver devices 300a, 300b as performed by the network node 200 and for receiving media of a media session as performed by the media transceiver device 300a applicable to both the methods performed by the network node 200 and the media transceiver device 300a will now be disclosed.

Information as how to control the transcoding of the media session is, according to an embodiment, based on a stored media transcoding consumption profile and a stored media capability profile of the at least one of the media transceiver devices 300a, 300b. The media transcoding consumption profile and the media capability profile is collectively denoted a Consumption and Media Capability Profile According to some aspects the media transceiver device 300a is allowed to provide updates to its media capability profile. Hence, according to an embodiment the media transceiver device 300a is configured to perform step S206:

S206: The media transceiver device 300a stores an update to the media capability profile of the media transceiver device 300a.

Whether to allow the media transceiver device 300a to store such updates can be under the discretion of the network node 200. It could further be under the discretion of the network node 200 to select whether such an update will take effect for currently running media sessions, or only for new media sessions initiated after the update has been stored by the media transceiver device 300a.

Further aspects of the Consumption and Media Capability Profile will be disclosed next.

Upon Session Initiation, the network node 200 requests consumption profiles from the media transceiver devices 300a, 300b participating in the media session. These consumption profiles are hereinafter referred to as Consumption and Media Capability Profiles (CMCPs). The CMCPs can be stored in a Consumption Profile database. Table 1 below shows two example CMCPs for two types of media transceiver devices, which could be stored in this database. MP4 is short for MPEG-4 Part 14, where MPEG is short for Moving Picture Experts Group, 4K refers to a display device or content having horizontal resolution on the order of 4000 pixels, EVS is short for Enhanced Voice Services, iLBC is short for Internet Low Bitrate Codec, EFR is short for Enhanced Full Rate codec, AMR is short for the Adaptive Multi-Rate codec, GSM-FR is short for the Global System for Mobile communications Full Rate codec, The CMCP Profile 1 could be used by a media transceiver device representing a contemporary smartphone. The CMCP Profile 2 could be used by a media transceiver device representing a legacy mobile phone.

TABLE 1

CMCPs for two different type of media transceiver devices; the codec preferences as displayed are given as non-limiting examples.

| CMCP Profile 1 | | CMCP Profile 2 | |
| --- | --- | --- | --- |
| Power Reserve | Codec by order of preference per medium | Power Reserve | Codec by order of preference per medium |
| 100%-80% of total | Video [MP4 4K, MP4 1080] Audio [EVS, G.711] | 100%-20% of total | Audio [EFR, GSM-FR] |
| 80%-60% of total | Video [MP4 480p] Audio [iLBC, EFR] | 20%-0.1% of total | Audio [GSM-FR] |
| 60%-5% of total | Video [MP4 240p] Audio [EFR, AMR, GSM-FR] | 0.1% or less of total | NOTIFY_PEERS ["Power Depleted"], END_SESSION |
| 5%-1% of total | Audio [EFR] | | |
| 1%-0.5% of total | NEW_SESSION[Text Messaging] | | |

TABLE 1-continued

CMCPs for two different type of media transceiver devices; the codec preferences as displayed are given as non-limiting examples.

| CMCP Profile 1 | | CMCP Profile 2 | |
| --- | --- | --- | --- |
| Power Reserve | Codec by order of preference per medium | Power Reserve | Codec by order of preference per medium |
| 0.5% or less of total | NOTIFY_PEERS ["Power Depleted"], END_SESSION | | |

The codecs are listed by media type and in brackets the preferred sequence. At different power levels different media can be supported. The "NEW_SESSION[Text Messaging] option" means that if the media transceiver device reaches levels of 1%-0.5% of total power reserve, then a new messaging session will be established to replace older power-consuming audio and/or video session. If the power is less than 0.5% on the media transceiver device having CMCP Profile 1 or 0.1% on the media transceiver device having CMCP Profile 2, the media session will be denied, with all media transceiver devices being notified (e.g. via SMS) that power of the media transceiver device is critically low.

There can be different ways for the network node 200 to obtain the indication of current allocation of energy in step S102 from the at least one of the media transceiver devices 300a, 300b, and conversely, for the media transceiver device 300a to provide the indication in step S202. The indication of current allocation of energy can be obtained by the network node 200 polling the at least one of the media transceiver devices 300a, 300b for the indication of current allocation of energy, by the network node 200 periodically receiving the indication of current allocation of energy without polling the at least one of the media transceiver devices 300a, 300b, or by the network node 200 receiving the indication of current allocation of energy each time the indication of current allocation of energy passes a threshold value. The threshold value could correspond to the media transceiver device 300a changing a power reserve band; hence one threshold value can be provided for each transition between power reserve bands.

The selection of codec or transcoding of one codec to another could, as well as the session type (i.e. video, audio, messaging, or combination of these), could then depend on the CMCPs of the media transceiver devices 300a, 300b involved in the media session. Tables 2 and 3 give some examples, based on the CMCPs presented in Table 1.

TABLE 2

Media codec choice examples based on the CMCP profiles and power reserve level of two media transceiver devices involved in a media session.

| Peer power reserve as percentage of total reserve [First media transceiver device and Second media transceiver device] | Chosen Codec | Transcoding Function Enabled | Choice Rationale |
| --- | --- | --- | --- |
| 85% and 89% | MP4 4K video codec/EVS | No | Both media transceiver devices support MP4 4K, have it as first preference |

TABLE 2-continued

Media codec choice examples based on the CMCP profiles and power reserve level of two media transceiver devices involved in a media session.

| Peer power reserve as percentage of total reserve [First media transceiver device and Second media transceiver device] | Chosen Codec | Transcoding Function Enabled | Choice Rationale |
|---|---|---|---|
| | audio codec | | for video sessions and are in the same power reserve band |
| 75% and 50% | MP4 240p video codec/EFR audio codec | No | Video codec choice is based on the first video codec preference of the media transceiver device in the lowest power reserve band. This video/audio codec preference has to be supported by all other media transceiver devices (regardless if they are currently on a higher power reserve band) |
| 74% and 4% | Video not possible due to critically low battery/ EFR audio codec | No | Power reserve of one of the media transceiver devices is substantially low. Video session cannot be initiated, or can no longer be supported; MTF transcodes media |
| 25% and 0.7% | Text Messaging | No | Power reserve of one of the media transceiver devices is critically low; MTF transcodes media, or initiates a messaging only session |

TABLE 3

Media codec choice examples based on the CMCP profiles and power reserve level of two media transceiver devices involved in a media session.

| Peer power reserve as percentage of total reserve [First media transceiver device and Second media transceiver device] | Chosen Codec from MSM | Transcoding function enabled | Choice Rationale |
|---|---|---|---|
| 85% and 25% | GSM-FR | No | Choice is based on the media transceiver device in the lower power band, and on the preferred codec of that media transceiver device (where this coded is also supported by the other media transceiver device) |
| 4% and 80% | EFR to GSM-FR | Yes | Even though the first media transceiver device supports the GSM-FR codec, it is not possible to use it because the power reserve level of the first media transceiver device is too low. Therefore, MTF transcodes EFR to GSM + FR |

There are different kinds of media transceiver devices 300a, 300b. According to an embodiment the at least one of the media transceiver devices 300a, 300b is battery operated. The indication of current allocation of energy could then represents a current battery level of the at least one of the media transceiver devices 300a, 300b. According to other embodiments the at least one of the media transceiver devices 300a, 300b is operated by means of solar power.

One or more of the media transceiver devices 300a, 300b could be plugged into a wall socket, and therefore charging. Hence, according to an embodiment the at least one of the media transceiver devices 300a, 300b is connected to an external power source that electrically charges the at least one of the media transceiver devices 300a, 300b. In this case, the network node 200 may consider controlling transcoding of the media session in the at least one of the media transceiver devices 300a, 300b, if applicable, using the assumption that all media transceiver devices 300a, 300b that are charging are in the highest power reserve band (regardless of their current reserve). Thus, according to this embodiment, as a result of the at least one of the media transceiver devices 300a, 300b is connected to an external power source that electrically charges the at least one of the media transceiver devices 300a, 300b the indication of current allocation of energy is defined to have a value given by highest available level of allocation of energy for media transcoding in the at least one of the media transceiver devices 300a, 300b. Further, this embodiment can be triggered when the network node 200 has established that the at least one of the media transceiver devices 300a, 300b has been charging for a while (for example a phone charging for at least 20 minutes). In some scenarios this embodiment is thus only applicable if the at least one of the media transceiver devices 300a, 300b has been charged for a minimum predetermined amount of time or reached a predetermined minimum level of charging.

If there are two or more media transceiver devices 300a, 300b, the at least one of the media transceiver devices 300a, 300b from which the indication of current allocation of energy for performing playback of the media session is received in step S102 has lowest current allocation of energy of all media transceiver devices 300a, 300b.

There can be different ways for the network node 200 to obtain the indication of current allocation of energy in step S102 and for the media transceiver device 300a to provide the indication in step S202. According to an embodiment the indication of current allocation of energy is provided in a Real-time Transport Protocol Control Protocol (RTCP) packet. In this respect, the Real-time Transport Protocol (RTP) is a network protocol for delivering audio and video over Internet Protocol (IP) networks. The RTP control protocol (RTCP) is part of the RTP protocol based on periodic transmission of control packets to all participants in the media session.

Two ways for introducing the indication of current allocation of energy in RTCP packets will now be disclosed.

According to a first example, the indication of current allocation of energy is carried in a RTCP Sender Report and a RTCP Receiver Report Besides having a header field, a sender (or receiver) information field, and report block field, there is in the RTCP Sender Report also an extension field. This extension field can be used for efficient transmission of the indication of current allocation of energy.

According to a second example, the indication of current allocation of energy is carried in an Application-Defined RTCP Packet. An application-defined RTCP Packet is a special RTCP packet for carrying application specific information.

Since the network node 200 may continuously collect the current allocation of energy for the media transceiver devices 300a, 300b, it is possible for the network node 200 to store such data in a device property profile in a database. According to some aspects the network node 200 is configured to store parameters such as device model, device age, device media codec, time, device location, device age, currently run applications on device, power consumption of applications, etc., and then predict how long media session can continue using the current settings based on the current allocation of energy and parameters stored in the database, or predict how long the media session can continue using other settings. The network node 200 can be configured to make predication about how long an ongoing media session can last based on the current allocation of energy and the data in the database. Hence, according to an embodiment the network node 200 is configured to control the transcoding of the media session based on a stored device property profile of the at least one of the media transceiver devices 300a, 300b. According to some aspects the network node 200 is configured to play an audio announcement to the media transceiver devices 300a, 300b for notification in case the media session is predicted to last shorted than a system defined threshold based on the current allocation of energy.

Figure 6:
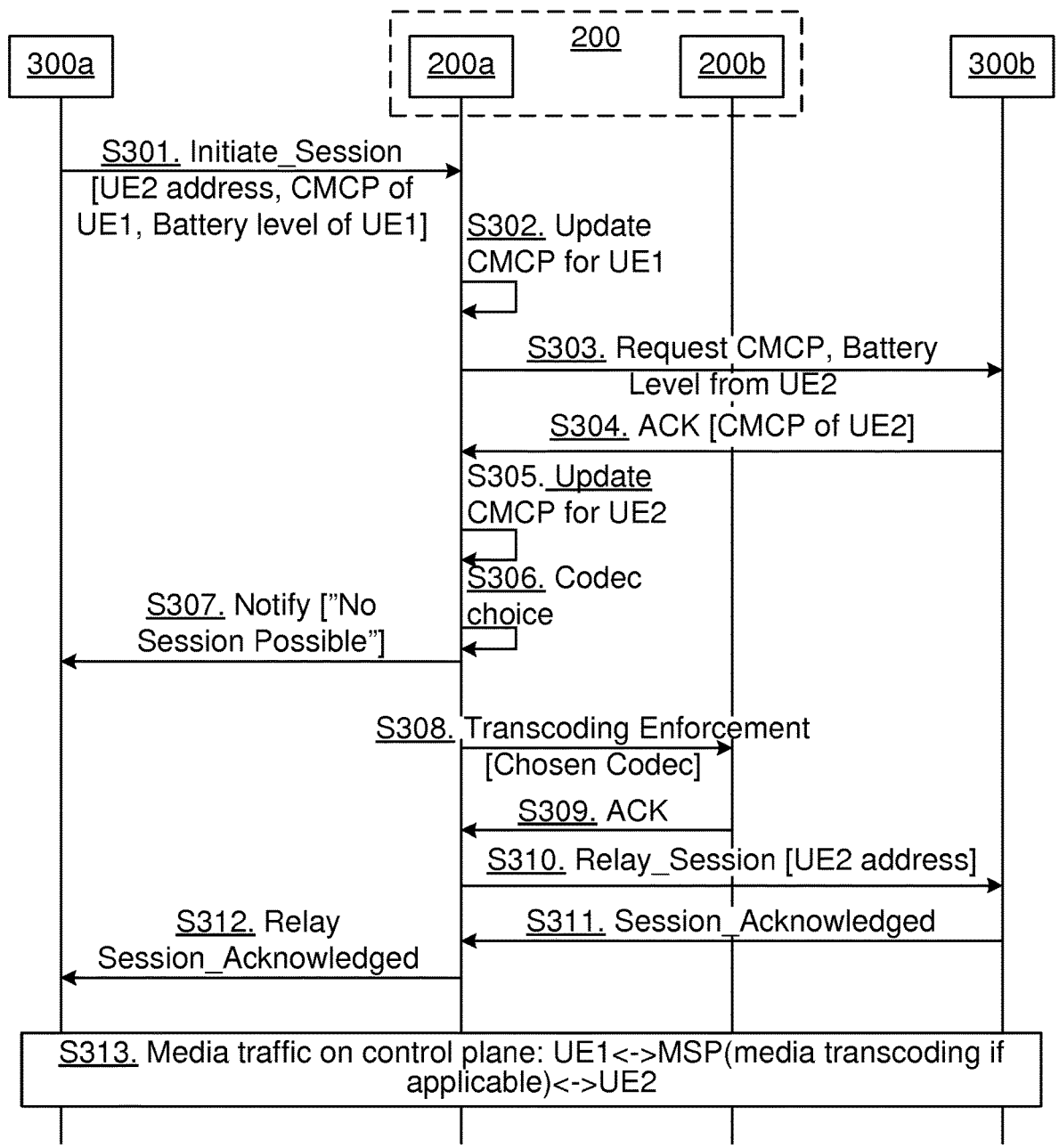
FIGS. 6, 7, 8, and 9 are signalling diagrams according to embodiments.

Aspects of session initiation will now be disclosed with reference to FIG. 6. FIG. 6 is a signalling diagram for session initiation between a network node 200 and two media transceiver devices 300a, 300b. Here, a first of the media transceiver devices 300a, 300b is denoted UE1 and a second of the media transceiver devices 300a, 300b is denoted UE2.

S301: UE1 initiates a new media session by sending a message Initiate_Session [UE2 address, CMCP of UE1, Battery level of UE1] to the MSC.

S302: The MSC updates the CMCP for UE1 based on the received CMCP of UE1.

S303: The MSC request the CMCP and battery level from UE2.

S304: UE2 responds with an acknowledgement (ACK) message ACK [CMCP of UE2].

S305: The MSC updates the CMCP for UE2 based on the received CMCP of UE2.

S306: The MSC selects a codec for the media session based on the parameters: CMCP for UE1, the CMCP for UE2, and the battery levels of UE1 and UE2.

If a codec cannot be found for the parameters step S307 is entered.

S307: The MSC issues a notification message Notify ["No Session Possible"] to UE1.

If a codec can be found for the parameters step S308 is entered.

S308: The MSC issues a message Transcoding Enforcement [Chosen Codec] to the MSP to enforce transcoding of the media session.

S309: The MSP responds with an acknowledgement (ACK) message.

S310: The MSC relays the new media session to UE2 in a message Relay_Session [UE2 address].

S311: UE2 responds to the MSC with a media session acknowledgement message Session_Acknowledged.

S312: The MSC relays the Session_Acknowledged message to UE1.

S313: The media session is ongoing between UE1 and UE2 with transcoding performed by the MSP when needed.

Aspects of updating the CMCP profile for a media transceiver device 300a will now be disclosed with reference to FIG. 7. FIG. 7 is a signalling diagram for updating the CMCP profile for a media transceiver device 300a. Here, the media transceiver device is denoted UE1.

Steps S401-S404 represents a scenario where UE1 initiates the update.

S401: UE1 sends the battery level and optionally its current CMCP to the MSM in a message Update [Battery Level and optionally CMCP].

S402: The MSM provides the updated CMCP for UE1 to the CMCP database in a message Update UE1 CMCP.

S403: The CMCP database responds with an ACK message.

S404: The MSM sends an ACK message to UE1 to confirm that the CMCP database has been updated.

Steps S405-S408 represents a scenario where the MSM initiates the update.

S405: The MSM polls UE1 for updated data of UE1 by sending a message Request for Update to UE1.

S406: UE1 responds with a message Update [Battery Level and optionally CMCP] to the MSM.

S407: The MSM provides the updated CMCP for UE1 to the CMCP database in a message Update UE1 CMCP.

S408: The CMCP database responds with an ACK message.

Aspects of CMCP and battery information update during an ongoing media session will now be disclosed with reference to FIG. 8. FIG. 8 is a signalling diagram for CMCP and battery information update between a network node 200 and two media transceiver devices 300a, 300b. Here, a first of the media transceiver devices 300a, 300b is denoted UE1 and a second of the media transceiver devices 300a, 300b is denoted UE2.

S501: The MSC obtains and updated CMCP profile and current battery level of UE1.

S502: The MSC obtains and updated CMCP profile and current battery level of UE2.

S503: The MSC selects a codec for the media session based on the CMCP for UE1, the CMCP for UE2, and the battery levels of UE1 and UE2.

S504: User plane communication between UE1 and UE2 continues.

S505: The MSC instructs UE1 to tear down the current media session.

S506: UE1 informs UE2 that the current media session is torn down.

S507: UE2 responds to UE1 with an ACK message.

S508: UE1 responds to the MSC with an ACK message that the current media session has been torn down.

S509: The MSC initiates a media session in a message Initiate_session [chosen codec] to UE1 with the codec selected in step S503.

S510: UE1 initiates the media session with UE2 and with the chosen codec by sending a message Initiate_session [UE2, chosen codec] to the MSC.

S511: The MSC forwards the message Initiate_session [UE2, chosen codec] to UE2.

S512: UE2 responds to the MSC with an ACK message.

S513: The MSC responds back to UE1 with an ACK message.

S514: User plane communication between UE1 and UE2 is ongoing with the chosen codec.

The MSC obtains an indication that transcoding of the media in the media session is necessary and therefore performs steps S515-S525:

S515: The MSC instructs UE1 to tear down the current media session.

S516: UE1 informs UE2 that the current media session is torn down.

S517: UE2 responds to UE1 with an ACK message.

S518: UE1 responds to the MSC with an ACK message that the current media session has been torn down.

S519: The MSC sends a transcoding enforcement for the media session between UE1 and UE2 to the MSP. The transcoding enforcement identifies a new codec for UE1 and the previously chosen codec for UE2.

S520: The MSP responds with an ACK message.

S521: The MSC initiates a media session in a message Initiate_session [chosen codec for UE1] to UE1 with the new codec chosen for UE1 in step S519.

S522: UE1 initiates the media session with UE2 by sending a message Initiate_session [UE2] to the MSC.

S523: The MSC in response to having received the message Initiate_session [UE2] from UE1 sends a message Initiate_session[UE2, chosen codec for UE2] to UE2.

S524: UE2 responds to the MSC with an ACK message.

S525: The MSC responds back to UE1 with an ACK message.

S526: User plane communication between UE1 and the MSP is ongoing with the codec chosen for UE1.

S527: The MSP performs transcoding between the codec used by UE1 and the codec used by UE2 and user plane communication between the MSP and the UE2 is ongoing with the codec chosen for UE2.

Figure 9:
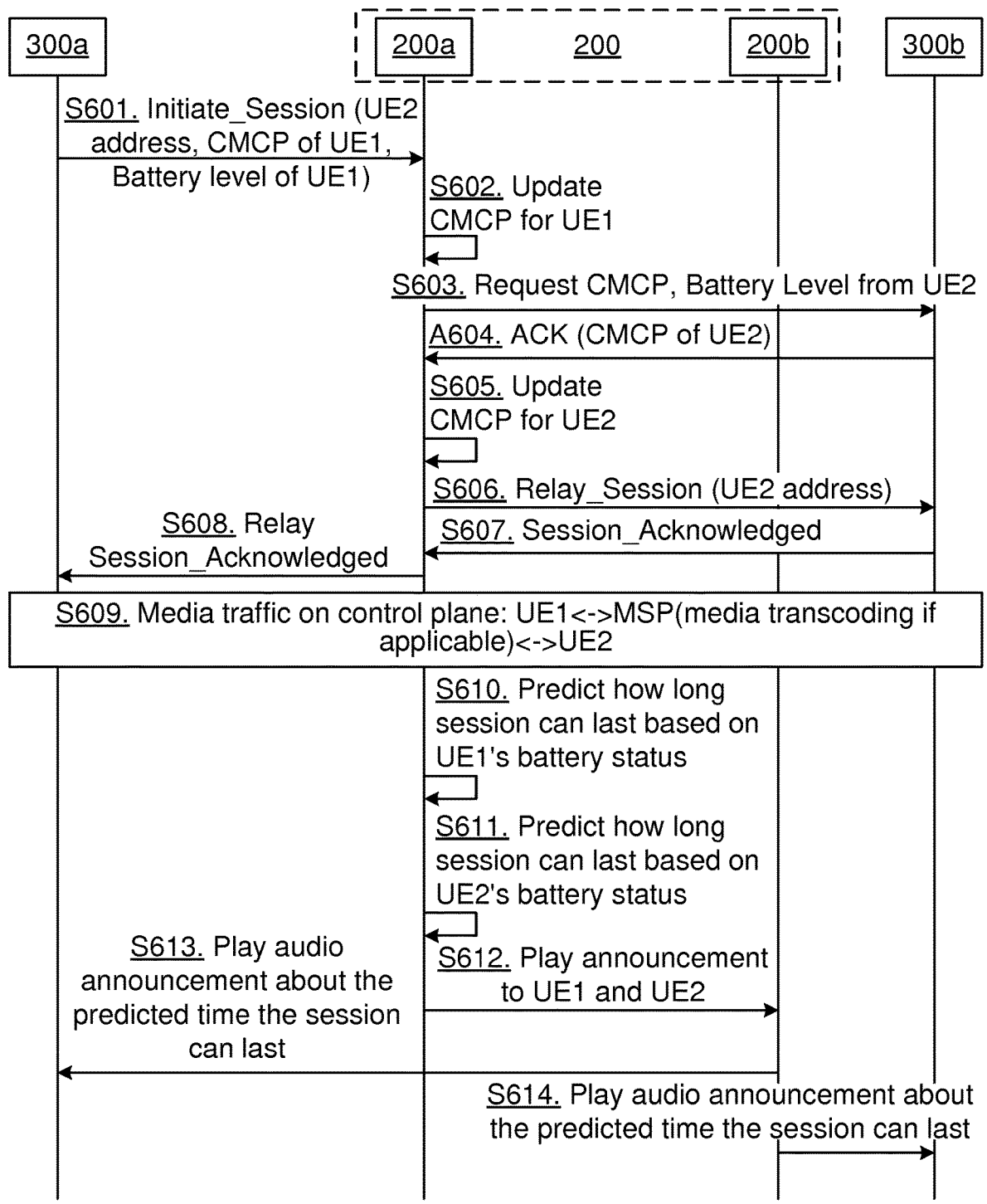

Aspects of prediction notifications will now be disclosed with reference to FIG. 9. FIG. 9 is a signalling diagram for notifications of predictions between a network node 200 and two media transceiver devices 300a, 300b. Here, a first of the media transceiver devices 300a, 300b is denoted UE1 and a second of the media transceiver devices 300a, 300b is denoted UE2.

S601: UE1 initiates a new media session by sending a message Initiate_Session [UE2 address, CMCP of UE1, Battery level of UE1] to the MSC.

S602: The MSC updates the CMCP for UE1 based on the received CMCP of UE1.

S603: The MSC request the CMCP and battery level from UE2.

S604: UE2 responds with an acknowledgement (ACK) message ACK [CMCP of UE2].

S605: The MSC updates the CMCP for UE2 based on the received CMCP of UE2.

S606: The MSC relays the new media session to UE2 in a message Relay_Session [UE2 address].

S607: UE2 responds to the MSC with a media session acknowledgement message Session_Acknowledged.

S608: The MSC relays the Session_Acknowledged message to UE1.

S609: The media session is ongoing between UE1 and UE2 with transcoding performed by the MSP when needed.

S610: The MSC predicts how long the media session can last based on the current battery status of UE1.

S611: The MSC predicts how long the media session can last based on the current battery status of UE2.

S612: The MSC notifies the MSP to play an announcement to UE1 and UE2 regarding the predicted length of the media session.

S613: The MSP plays an audio announcement about the predicted time the media session can last to UE1.

S614: The MSP plays an audio announcement about the predicted time the media session can last to UE2.

Figure 10:
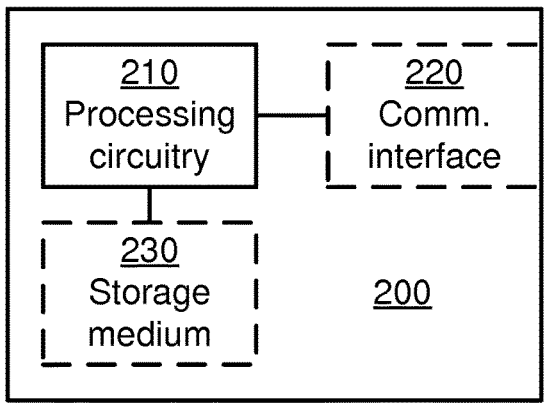
FIG. 10 is a schematic diagram showing functional units of a network node according to an embodiment.

FIG. 10 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1410a (as in FIG. 14), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, S102-S104, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200 may further comprise a communications interface 220 for communications at least with media transceiver devices 300a, 300b. As such the communications interface 220 may comprise one or more transmitters and receivers, comprising analogue and digital components and a suitable number of antennas for wireless communications and ports for wireline communications.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 11:
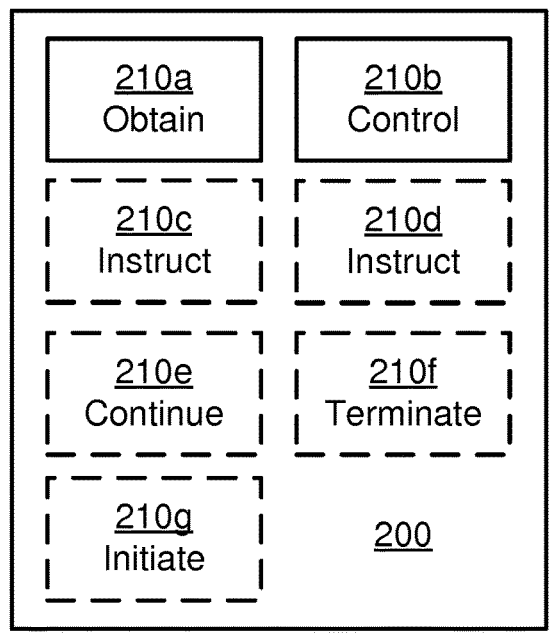
FIG. 11 is a schematic diagram showing functional modules of a network node according to an embodiment.

FIG. 11 schematically illustrates, in terms of a number of functional modules, the components of a network node 200 according to an embodiment. The network node 200 of FIG. 11 comprises a number of functional modules; an obtain module 210a configured to perform step S102, and a control module 210b configured to perform step S104. The network node 200 of FIG. 11 may further comprise a number of optional functional modules, such as any of an instruct module 210C configured to perform step S104a, an instruct module 210d configured to perform step S104b, an continue module 210e configured to perform step S104c, a terminate module 210f configured to perform step S104d, and an initiate module 210g configured to perform step S104e.

In general terms, each functional module 210a-210g may be implemented in hardware or in software. Preferably, one or more or all functional modules 210a-210g may be implemented by the processing circuitry 210, possibly in cooperation with functional units 220 and/or 230. The processing circuitry 210 may thus be arranged to from the storage medium 230 fetch instructions as provided by a functional module 210a-210g and to execute these instructions, thereby performing any steps of the network node 200 as disclosed herein.

In general terms, the network node 200 may be provided as a standalone device or as a part of at least one further device. For example, the functionality of the network node 200 can be implemented as an additional feature of the Multimedia Resource Function of the Internet protocol Multimedia Subsystem (IMS). Alternatively, functionality of the network node 200 may be distributed between at least two devices, or nodes. These at least two nodes, or devices, may either be part of the same network part or may be spread between at least two such network parts. Specifically, the MSC functionality and the MSP functionality described above can be implemented to extend functionality of the existing Multimedia Resource Function Controller (MRFC) and Multimedia Resource Function Processor (MRFP), respectively, in the IMS. Further, the network node 200 could be physically located on a device, such as on a media transceiver device 300a, 300 (and hence not on a server). In this way, two media transceiver device 300a, 300b (where at least one of the media transceiver devices 300a, 300b implements the functionality of such a network node 200) can communicate in a peer-to-peer fashion without the media being routed through a dedicated server for transcoding in the communications system 100.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 10 the processing circuitry 210 may be distributed among a plurality of devices, or nodes. The same applies to the functional modules 210a-210g of FIG. 11 and the computer program 1420a of FIG. 14 (see below).

Figure 12:
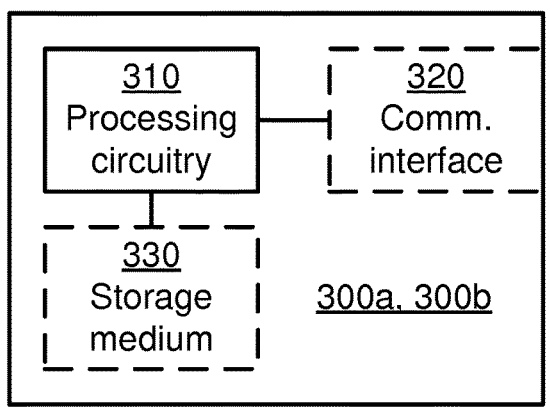
FIG. 12 is a schematic diagram showing functional units of a media transceiver device according to an embodiment.

FIG. 12 schematically illustrates, in terms of a number of functional units, the components of a media transceiver device 300a according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1410b (as in FIG. 14), e.g. in the form of a storage medium 330. The processing circuitry 310 may further be provided as at least one application specific integrated circuit (ASIC), or field programmable gate array (FPGA).

Particularly, the processing circuitry 310 is configured to cause the media transceiver device 300a to perform a set of operations, or steps, S202-S206, as disclosed above. For example, the storage medium 330 may store the set of operations, and the processing circuitry 310 may be configured to retrieve the set of operations from the storage medium 330 to cause the media transceiver device 300a to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The media transceiver device 300a may further comprise a communications interface 320 for communications at least with the network node 200. As such the communications interface 320 may comprise one or more transmitters and receivers, comprising analogue and digital components and a suitable number of antennas for wireless communications and ports for wireline communications.

The processing circuitry 310 controls the general operation of the media transceiver device 300a e.g. by sending data and control signals to the communications interface 320 and the storage medium 330, by receiving data and reports from the communications interface 320, and by retrieving data and instructions from the storage medium 330. Other components, as well as the related functionality, of the media transceiver device 300a are omitted in order not to obscure the concepts presented herein.

Figure 13:
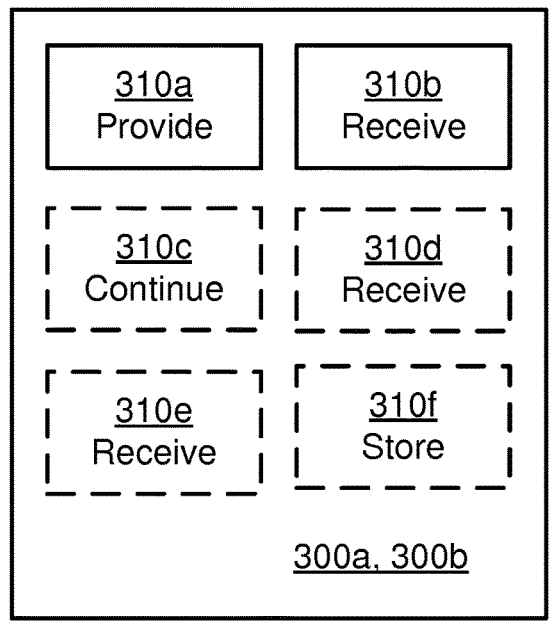
FIG. 13 is a schematic diagram showing functional modules of a media transceiver device according to an embodiment.

FIG. 13 schematically illustrates, in terms of a number of functional modules, the components of a media transceiver device 300a according to an embodiment. The media transceiver device 300a of FIG. 13 comprises a number of functional modules; a provide module 310a configured to perform step S202, and a receive module 310b configured to perform step S204. The media transceiver device 300a of FIG. 13 may further comprises a number of optional functional modules, such as any of a continue module 310c configured to perform step S204a, a receive module 310d configured to perform step S204b, a receive module 310e configured to perform step S204c, and a store module 310f configured to perform step S206.

In general terms, each functional module 310a-310f may be implemented in hardware or in software. Preferably, one or more or all functional modules 310a-310f may be implemented by the processing circuitry 310, possibly in cooperation with functional units 320 and/or 330. The processing circuitry 310 may thus be arranged to from the storage medium 330 fetch instructions as provided by a functional module 310a-310f and to execute these instructions, thereby performing any steps of the media transceiver device 300a as disclosed herein.

Figure 14:
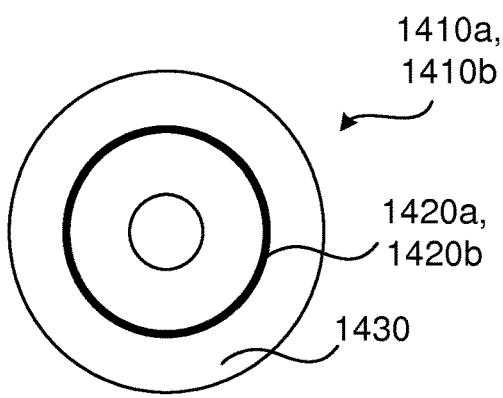
FIG. 14 shows one example of a computer program product comprising computer readable means according to an embodiment.

FIG. 14 shows one example of a computer program product 1410a, 1410b comprising computer readable means 1430. On this computer readable means 1430, a computer program 1420a can be stored, which computer program 1420a can cause the processing circuitry 210 and thereto operatively coupled entities and devices, such as the communications interface 220 and the storage medium 230, to execute methods according to embodiments described herein. The computer program 1420a and/or computer program product 1410a may thus provide means for performing any steps of the network node 200 as herein disclosed. On this computer readable means 1430, a computer program 1420b can be stored, which computer program 1420b can cause the processing circuitry 310 and thereto operatively coupled entities and devices, such as the communications interface 320 and the storage medium 330, to execute methods according to embodiments described herein. The computer program 1420b and/or computer program product 1410b may thus provide means for performing any steps of the media transceiver device 300a as herein disclosed.

In the example of FIG. 14, the computer program product 1410a, 1410b is illustrated as an optical disc, such as a CD (compact disc) or a DVD (digital versatile disc) or a Blu-Ray disc. The computer program product 1410a, 1410b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1420a, 1420b is here schematically shown as a track on the depicted optical disk, the computer program 1420a, 1420b can be stored in any way which is suitable for the computer program product 1410a, 1410b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method, performed by a network node, for controlling media transcoding of a media session between at least two media transceiver devices, the method comprising:
   obtaining, from at least one of the at least two media transceiver devices, an indication of a current allocation of energy for performing playback of the media session in the at least one media transceiver device,
   wherein the at least one media transceiver device has lowest current allocation of energy of all of the at least two media transceiver devices; and
   controlling transcoding of the media session according to the current allocation of energy of the at least one media transceiver device, the transcoding comprising either conversion from a first media format to a second media format of a same media type, or conversion from a first media type to a second media type.

2. The method of claim 1:
   wherein the controlling the transcoding of the media session comprises instructing a media transcoding function to transcode media to be delivered to the at least one media transceiver device from the first media format to the second media format; and
   wherein the second media format requires lower allocation of energy for the playback of the media session than the first media format.

3. The method of claim 1:
   wherein the controlling the transcoding of the media session comprises instructing a media transcoding function to transcode media to be delivered to the at least one media transceiver device from the first media type to the second media type; and
   wherein the second media type requires lower allocation of energy for the playback of the media session than the first media type.

4. The method of claim 1, further comprising continuing the media session without termination when controlling the transcoding of the media session.

5. The method of claim 1, wherein the controlling the transcoding comprises:
   terminating the media session before controlling the transcoding of the media session; and
   initiating, upon having controlled the transcoding of the media session, a new media session between the at least two media transceiver devices so as to continue the media session.

6. The method of claim 1, wherein the indication of the current allocation of energy is obtained: by polling the at least one media transceiver device for the indication of the current allocation of energy, by periodically receiving the indication of the current allocation of energy without polling the at least one media transceiver device, or by receiving the indication of the current allocation of energy each time the indication of the current allocation of energy passes a threshold value.

7. The method of claim 1, wherein the transcoding of the media session is controlled based on a stored media transcoding consumption profile and a stored media capability profile of the at least one media transceiver device.

8. The method of claim 1, wherein the transcoding of the media session is controlled based on a stored device property profile of the at least one media transceiver device.

9. The method of claim 1:
   wherein the at least one media transceiver device is battery operated; and
   wherein the indication of the current allocation of energy represents a current battery level of the at least one media transceiver device.

10. The method of claim 1:
    wherein the at least one media transceiver device is connected to an external power source electrically charging the at least one media transceiver device; and
    wherein, as a result of electrically charging the at least one media transceiver device, the indication of the current allocation of energy is defined to have a value given by highest available level of allocation of energy for media transcoding in the at least one media transceiver device.

11. The method of claim 1, wherein the indication of the current allocation of energy is obtained by receiving the indication of the current allocation of energy each time the indication of the current allocation of energy passes a threshold value, and wherein the threshold value corresponds to the at least one media transceiver device changing a power reserve band.

12. The method of claim 1, wherein the indication of the current allocation of energy is provided in a Real-time Transport Protocol Control Protocol (RTCP).

13. The method of claim 1, further comprising:
    predicting how long the media session can last based on the indication of the current allocation of energy obtained from the at least one media transceiver device; and
    notifying the at least one media transceiver device regarding the predicted length of the media session.

14. A method, performed by a media transceiver device, for receiving media of a media session, the method comprising:
    providing an indication of a current allocation of energy for performing playback of the media session in the media transceiver device to a network node; and
    receiving transcoded media of the media session, wherein transcoding of the media session has, by the network node, been controlled according to the current allocation of energy, the transcoding comprising either conversion from a first media format to a second media format of same media type, or conversion from a first media type to a second media type, and wherein receiving the transcoded media of the media session comprises:
      receiving instructions to terminate the media session before having the transcoding of the media session controlled by the network node; and
      receiving initiation of a new media session between at least two media transceiver devices so as to continue the media session upon having the transcoding of the media session been controlled by the network node.

15. The method of claim 14, wherein the indication of the current allocation of energy is provided: by being polled by the network node, by periodically providing the indication of the current allocation of energy without being polled by the network node, or by providing the indication of the current allocation of energy each time the indication of the current allocation of energy passes a threshold value.

16. The method of claim 14, further comprising storing an update to a media capability profile of the media transceiver device.

17. The method of claim 14:
wherein the media transceiver device is battery operated; and
wherein the indication of the current allocation of energy represents a current battery level of the media transceiver device.

18. The method of claim 14:
wherein the media transceiver device is connected to an external power source electrically charging the media transceiver device; and
wherein, as a result of electrically charging the media transceiver device, the indication of the current allocation of energy is defined to have a value given by highest available level of allocation of energy for media transcoding in the media transceiver device.

19. A network node for controlling media transcoding of a media session between at least two media transceiver devices, the network node comprising:
processing circuitry; and
memory containing instructions executable by the processing circuitry whereby the network node is operative to:
  obtain, from at least one of the at least two media transceiver devices, an indication of a current allocation of energy for performing playback of the media session in the at least one media transceiver device,
  wherein the at least one media transceiver device has lowest current allocation of energy of all of the at least two media transceiver devices; and
  control transcoding of the media session according to the current allocation of energy of the at least one media transceiver device, the transcoding comprising either conversion from a first media format to a second media format of same media type, or conversion from a first media type to a second media type.

20. A media transceiver device for receiving media of a media session, the media transceiver device comprising:
processing circuitry; and
memory containing instructions executable by the processing circuitry whereby the media transceiver device is operative to:
  provide an indication of a current allocation of energy for performing playback of the media session in the media transceiver device to a network node; and
  receive transcoded media of the media session, wherein transcoding of the media session has, by the network node, been controlled according to the current allocation of energy, the transcoding comprising either conversion from a first media format to a second media format of same media type, or conversion from a first media type to a second media type, and
  wherein to receive the transcoded media of the media session, the media transceiver device is operative to:
    receive instructions to terminate the media session before having the transcoding of the media session controlled by the network node; and
    receive initiation of a new media session between at least two media transceiver devices so as to continue the media session upon having the transcoding of the media session been controlled by the network node.

\* \* \* \* \*